(12) United States Patent
Cramail et al.

(10) Patent No.: US 10,087,281 B2
(45) Date of Patent: Oct. 2, 2018

(54) BRANCHED POLYMERS, THEIR PREPARATION PROCESS, AND USES THEROF

(71) Applicants: PIVERT, Venette (FR); UNIVERSITÉ DE BORDEAUX, Bordeaux (FR); INSTITUT DES CORPS GRAS ETUDES ET RECHERCHES TECHNIQUES—ITERG, Pessac (FR); CENTRE NATIONAL DE LA RECHERCHE SCIENTIFIQUE, Paris (FR); INSTITUT POLYTECHNIQUE DE BORDEAUX, Talence (FR)

(72) Inventors: Henri Cramail, Sainte Terre (FR); Etienne Grau, Talence (FR); Blandine Testud, Talence (FR); Daniel Taton, Camarsac (FR); Didier Pintori, Talence (FR)

(73) Assignees: Pivert, Venette (FR); Université de Bordeaux, Bordeaux (FR); Institut Des Corps Gras Etudes ET Recherches Techniques—ITERG, Pessac (FR); Institut Polytechnique de Bordeaux, Talence (FR); Centre National de la Recherche Scientifique, Paris (FR)

( * ) Notice: Subject to any disclaimer, the term of this patent is extended or adjusted under 35 U.S.C. 154(b) by 0 days.

(21) Appl. No.: 15/518,374

(22) PCT Filed: Oct. 16, 2015

(86) PCT No.: PCT/EP2015/074049
§ 371 (c)(1),
(2) Date: Apr. 11, 2017

(87) PCT Pub. No.: WO2016/059230
PCT Pub. Date: Apr. 21, 2016

(65) Prior Publication Data
US 2017/0306082 A1 Oct. 26, 2017

(30) Foreign Application Priority Data
Oct. 16, 2014 (EP) .................................... 14306642

(51) Int. Cl.
*C08L 47/00* (2006.01)
*C08G 63/06* (2006.01)
*C08L 67/06* (2006.01)
*C08L 67/04* (2006.01)

(52) U.S. Cl.
CPC .............. *C08G 63/06* (2013.01); *C08L 47/00* (2013.01); *C08L 67/04* (2013.01); *C08L 67/06* (2013.01); *C08G 2261/132* (2013.01); *C08G 2261/1422* (2013.01); *C08G 2261/1424* (2013.01)

(58) Field of Classification Search
USPC .......................... 528/271, 272, 288, 291, 300
See application file for complete search history.

(56) References Cited

U.S. PATENT DOCUMENTS

| 5,344,946 A | 9/1994 | Warwel et al. |
| 2014/0235814 A1 | 8/2014 | Cramail et al. |

OTHER PUBLICATIONS

International Search Report issued for International Patent Application No. PCT/EP2015/074049, dated Jan. 13, 2016, 2 pages.

*Primary Examiner* — Terressa Boykin
(74) *Attorney, Agent, or Firm* — Duane Morris LLP

(57) ABSTRACT

A polymer is provided having at least one repetitive unit represented by the following formula:

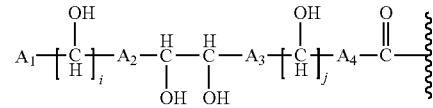

And, preferably at least one, preferably at least two, repetitive units represented by the following formula:

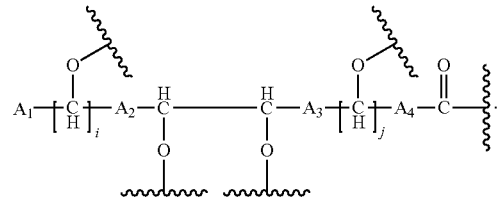

13 Claims, No Drawings

BRANCHED POLYMERS, THEIR PREPARATION PROCESS, AND USES THEROF

CROSS-REFERENCE TO RELATED PATENT APPLICATIONS

The present application is a U.S. national stage application under 35 U.S.C. § 371 of PCT Application No. PCT/EP2015/074049, filed Oct. 16, 2015, which claims priority to European patent application no. 14306642.1, filed Oct. 16, 2014, the entireties of which are incorporated herein by reference.

The present invention concerns new branched polymers, and in particular branched polyesters, and their process of preparation.

The present invention also concerns new branched polymers susceptible to be obtained according to the process of the invention, as well as uses thereof.

Over the last decades, branched polymers have attracted a growing interest because of their unique architecture.

Branched polymers belong to a class of synthetic tree-like macromolecules called dendritic polymers (Gao and Yan, 2004). They are polymers with densely branched structure and a large number of end groups. Dendritic polymers include dendrimers which have completely branched star-like topologies and branched polymers which have imperfectly branched or irregular structures.

Due to their unique properties, branched polymers have a wide range of applications. Branched polymers can be used as additives, such as tougheners for thermosets, cross-linking or adhesive agents, dispersers, compatibilizers or rheology modifiers . . . .

There is a need for new branched polymers, and more particularly for new renewable branched polymers.

The aim of the present invention is to provide new branched polymers, and more particularly new renewable branched polymers.

The aim of the present invention is also to provide a process of preparation of branched polymers, easy to be implemented.

Therefore, the present invention relates to a polymer comprising:
i) at least one repetitive unit (V) having the following formula (T):

$$A_1\text{---}[\underset{H}{\overset{OH}{\underset{|}{C}}}]_i\text{---}A_2\text{---}\underset{OH}{\overset{H}{\underset{|}{C}}}\text{---}\underset{OH}{\overset{H}{\underset{|}{C}}}\text{---}A_3\text{---}[\underset{H}{\overset{OH}{\underset{|}{C}}}]_j\text{---}A_4\text{---}\overset{O}{\underset{}{\overset{\|}{C}}}\text{---}\quad (T)$$

and
ii) at least one, preferably at least two, repetitive unit(s) (U) having the following formula (D):

$$A_1\text{---}[\underset{H}{\overset{}{\underset{|}{C}}}]_i\text{---}A_2\text{---}\underset{O}{\overset{H}{\underset{|}{C}}}\text{---}\underset{O}{\overset{H}{\underset{|}{C}}}\text{---}A_3\text{---}[\underset{H}{\overset{}{\underset{|}{C}}}]_j\text{---}A_4\text{---}\overset{O}{\underset{}{\overset{\|}{C}}}\text{---}\quad (D)$$

or
at least one, preferably at least two, repetitive unit(s) (Q) having the following formula (S):

$$A_1\text{---}\underset{H}{\overset{OR_1}{\underset{|}{C}}}\text{---}A_2\text{---}\underset{OR_2}{\overset{H}{\underset{|}{C}}}\text{---}\underset{OR_3}{\overset{H}{\underset{|}{C}}}\text{---}A_3\text{---}A_4\text{---}\overset{O}{\underset{}{\overset{\|}{C}}}\text{---}\quad (S)$$

or
at least one, preferably at least two, repetitive unit(s) (Q) having the following formula (S'):

$$A_1\text{---}\underset{H}{\overset{OR_1}{\underset{|}{C}}}\text{---}\underset{H}{\overset{OR'_1}{\underset{|}{C}}}\text{---}A_2\text{---}\underset{OR_2}{\overset{H}{\underset{|}{C}}}\text{---}\underset{OR_3}{\overset{H}{\underset{|}{C}}}\text{---}A_3\text{---}A_4\text{---}\overset{O}{\underset{}{\overset{\|}{C}}}\text{---}\quad (S')$$

wherein:
$A_1$ represents H or a linear or branched divalent alkyl group comprising from 1 to 20 carbon atoms, preferably from 2 to 12, and more preferably from 5 to 10;
$A_4$ represents a linear or branched divalent alkylene radical comprising from 1 to 20 carbon atoms, preferably from 2 to 12, and more preferably from 4 to 10;
$A_2$ represents a bond or a linear or branched divalent alkylene radical comprising from 1 to 20 carbon atoms, preferably from 1 to 10, and more preferably from 1 to 5;
$A_3$ represents a linear or branched divalent alkylene radical comprising from 1 to 20 carbon atoms, preferably from 1 to 10, and more preferably from 1 to 5;
$R_1$, $R'_1$, $R_2$ and $R_3$ are $$-\!\!\!\{$$

or H;
i is 0, 1 or 2;
j is 0 or 1;
i being 0 when j is 1 and j being 0 when i is 1 or 2;
when $A_1$ is H and i is 0, then $A_2$ is a bond,
and wherein:
in the unit (U) having the formula (S), only one of $R_1$, $R_2$ and $R_3$ is H;
in the unit (U) having the formula (S'), one or two of $R_1$, $R'_1$, $R_2$ and $R_3$ is H.

In one embodiment, the present invention relates to a polymer comprising:
at least one repetitive unit (V) having the following formula (T) as defined above, and
at least one, preferably at least two repetitive unit(s) (U) having the following formula (D) as defined above.

In one embodiment, when i=j=0, then the polymer comprises at least one repetitive unit (U) having the formula (D) and at least one unit (V) having the formula (T).

In one embodiment, when at least one of i or j is different from 0, then the polymer comprises at least one repetitive unit (Q) having the formula (S) and at least one unit (V)

having the formula (T), or the polymer comprises at least one repetitive (Q) having the formula (S') and at least one unit (V) having the formula (T).

The inventors advantageously synthesized new renewable branched polymers, from renewable monomers, having interesting properties. The inventors notably developed a facile and efficient process to yield new branched renewable polymers.

In one embodiment, the polymer according to the invention further comprises at least one repetitive unit (W) having the following formula (L):

$$A_1-\left[\begin{array}{c}OR_1\\|\\C\\|\\H\end{array}\right]_i-A_2-\overset{H}{\underset{OR_2}{C}}-\overset{H}{\underset{OR_3}{C}}-A_3-\left[\begin{array}{c}OR_4\\|\\C\\|\\H\end{array}\right]_j-A_4-\overset{O}{\overset{\|}{C}}-\xi \quad (L)$$

wherein:
$A_1$, $A_2$, $A_3$, $A_4$, i and j are as defined above;
$R_1$, $R_2$, $R_3$ and $R_4$ are $-\xi$ or H, three of $R_1$, $R_2$, $R_3$ and $R_4$ being H.

According to an embodiment, in the unit (W) having the formula (L), when i is 2, then the polymer comprises two $R_1$ groups which may be identical or different.

In one embodiment, the polymer according to the invention comprises:
- at least one, preferably at least two, repetitive unit(s) (U) having the formula (D);
- at least one, preferably at least two, repetitive unit(s) (V) having the formula (T);
- at least one, preferably at least two, repetitive unit(s) (W) having the formula (L); and
- optionally at least one, preferably at least two, repetitive unit(s) (Q) having the formula (S) or (S').

In one embodiment, the polymer according to the invention comprises:
- at least one, preferably at least two, repetitive unit(s) (Q) having the formula (S);
- at least one, preferably at least two, repetitive unit(s) (V) having the formula (T);
- at least one, preferably at least two, repetitive unit(s) (W) having the formula (L); and
- optionally at least one, preferably at least two, repetitive unit(s) (Q) having the formula (S) or (S').

In one embodiment, the polymer according to the invention comprises:
- at least one, preferably at least two, repetitive unit(s) (Q) having the formula (S');
- at least one, preferably at least two, repetitive unit(s) (V) having the formula (T);
- at least one, preferably at least two, repetitive unit(s) (W) having the formula (L), and
- optionally at least one, preferably at least two, repetitive unit(s) (Q) having the formula (S) or (S').

According to one embodiment, in the above formulae (D), (T) and (L), i=j=0.

According to one embodiment, in the above formulae (D), (T) and (L), i=1 and j=0.

According to one embodiment, in the above formulae (D), (T) and (L), i=2 and j=0.

In one embodiment, in the polymer according to the invention, the repetitive unit (U) has the following formula (D1):

$$A_1-A_2-\overset{H}{\underset{O}{C}}-\overset{H}{\underset{O}{C}}-A_3-A_4-\overset{O}{\overset{\|}{C}}-\xi \quad (D1)$$

wherein $A_1$, $A_2$, $A_3$ and $A_4$ are as defined above.

A unit having formula (D1) corresponds to a unit having formula (D) as mentioned above, wherein i=j=0.

In one embodiment, in the polymer according to the invention, the repetitive unit (V) has the following formula (T1):

$$A_1-A_2-\overset{H}{\underset{OH}{C}}-\overset{H}{\underset{OH}{C}}-A_3-A_4-\overset{O}{\overset{\|}{C}}-\xi \quad (T1)$$

wherein $A_1$, $A_2$, $A_3$ and $A_4$ are as defined above.

A unit having formula (T1) corresponds to a unit having formula (T) as mentioned above, wherein i=j=0.

In one embodiment, the polymer according to the invention comprises at least one unit (W) having the following formula (L'):

$$A_1-A_2-\overset{H}{\underset{OR_2}{C}}-\overset{H}{\underset{OR_3}{C}}-A_3-A_4-\overset{O}{\overset{\|}{C}}-\xi \quad (L')$$

wherein:
$A_1$, $A_2$, $A_3$, and $A_4$ are as defined above;
$R_2$ and $R_3$ are $-\xi$ or H, only one of $R_2$ and $R_3$ being H.

A unit having formula (L') corresponds to a unit having formula (L) as mentioned above, wherein i=j=0.

In one embodiment, the polymer according to the invention comprises:
- at least one repetitive unit (W) having the following formula (L1):

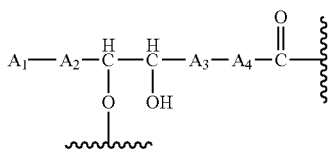

(L1)

and/or at least one repetitive unit (W) having the following formula (L2):

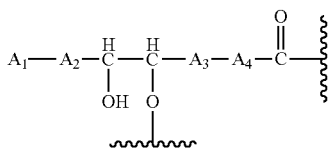

(L2)

wherein $A_1$, $A_2$, $A_3$ and $A_4$ are as defined above.

A unit having formula (L1) corresponds to a unit having formula (L') as mentioned above, wherein $R_3$=H.

A unit having formula (L2) corresponds to a unit having formula (L') as mentioned above, wherein $R_2$=H.

In one embodiment, the polymer according to the invention comprises at least one repetitive unit (W) having the formula (L1).

In one embodiment, the polymer according to the invention comprises at least one repetitive unit (W) having the formula (L2).

In one embodiment, the polymer according to the invention comprises at least one repetitive unit (W) having the formula (L1) and at least one repetitive unit having the formula (L2).

In one embodiment, the polymer according to the invention comprises at least one unit (W) having the following formula (L"):

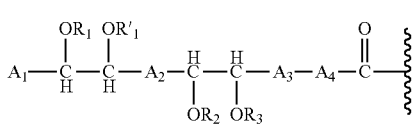

(L")

wherein:

$A_1$, $A_2$, $A_3$, and $A_4$ are as defined above;

$R_1$, $R'_1$, $R_2$ and $R_3$ are

or H, only one of $R_1$, $R'_1$, $R_2$ and $R_3$ being H.

A unit having formula (L") corresponds to a unit having formula (L) as mentioned above, wherein i=2 and j=0.

In one embodiment, the polymer according to the invention comprises at least one repetitive unit (Z) having the formula (I):

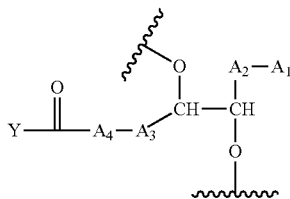

(I)

wherein:

$A_1$, $A_2$, $A_3$, and $A_4$ are as defined above;

Y represents —$OR_a$, $R_a$ being selected from the group consisting of: H, a linear or branched alkyl group comprising from 1 to 20 carbon atoms and an aryl group comprising from 6 to 22 carbon atoms.

In one embodiment, in the polymer according to the invention, the repetitive unit (Z) has the formula (I) wherein Y is —OMe.

In one embodiment, in the polymer according to the invention, the repetitive unit (Z) has the formula (I) wherein Y is —OH.

In one embodiment, the above-mentioned repetitive unit (Z) has the formula (I-1):

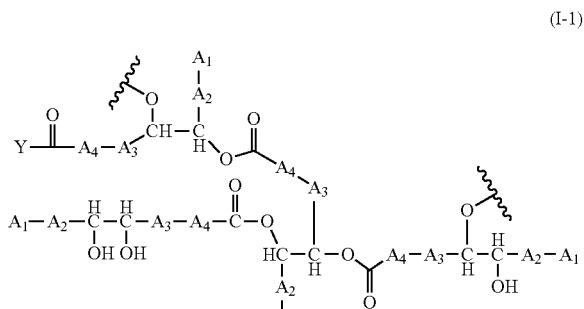

(I-1)

Y, $A_1$, $A_2$, $A_3$ and $A_4$ being as defined above.

In one embodiment, the repetitive unit (Z) has the formula (I) as mentioned above wherein the radical $A_1$-$A_2$- is an alkyl group comprising 8 carbon atoms.

In one embodiment, the repetitive unit (Z) has the formula (I) as mentioned above wherein the radical $A_1$-$A_2$- is H ($A_2$ being a bond and $A_1$ being H).

In one embodiment, the repetitive unit (Z) has the formula (I) as mentioned above wherein the radical -$A_3$-$A_4$- is an alkylene radical comprising 11 carbon atoms.

In one embodiment, the repetitive unit (Z) has the formula (I) as mentioned above wherein the radical -$A_3$-$A_4$- is an alkylene radical comprising 8 carbon atoms.

In one embodiment, the above-mentioned repetitive unit (Z) has the formula (I-1-1):

(I-1-1)

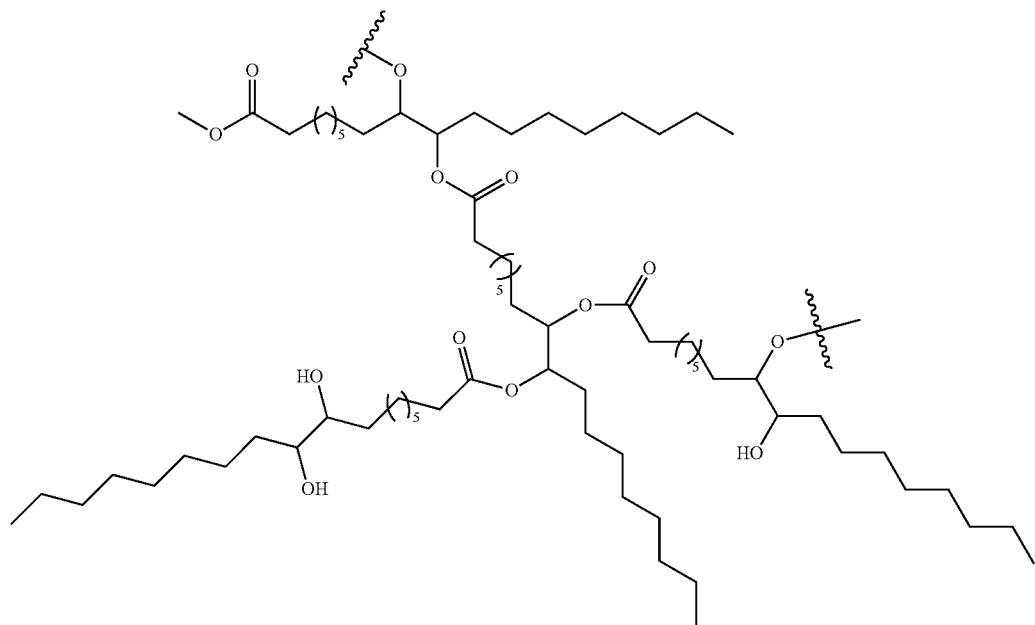

In one embodiment, the repetitive unit (Z) has the formula (I-1-2):

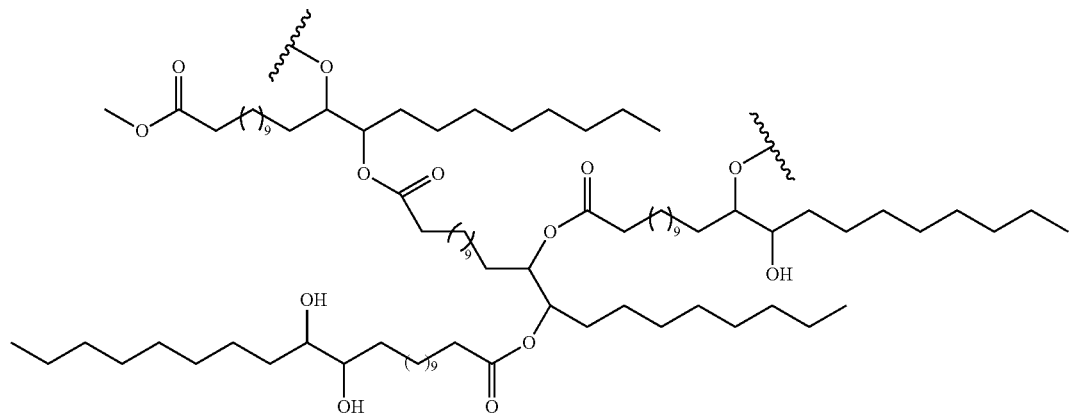

In one embodiment, the repetitive unit (Z) has the formula (I-1-3):

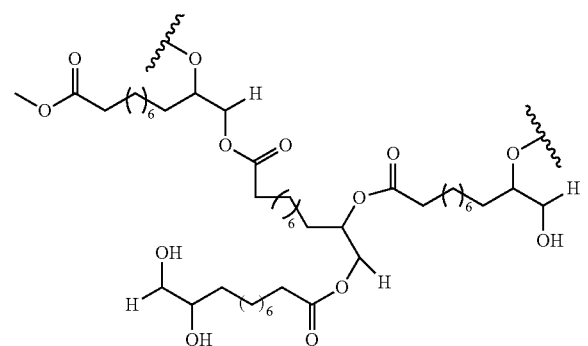

In one embodiment, the polymer according to the invention comprises:
- at least one repetitive unit (U) having the formula (D1) as defined above;
- at least one repetitive unit (V) having the formula (T1) as defined above;
- at least one repetitive unit (W) having the formula (L1) as defined above;
- at least one repetitive unit (W) having the formula (L2) as defined above; and
- optionally at least one repetitive unit (Z) having the formula (I-1) as defined above, in particular having the formula (I-1-1), (I-1-2) or (I-1-3).

In another embodiment, in the polymer according to the invention, the repetitive unit (U) has the following formula (D2):

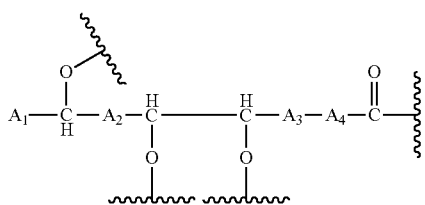

(D2)

wherein $A_1$, $A_2$, $A_3$ and $A_4$ are as defined above.

A unit having formula (D2) corresponds to a unit having formula (D) as mentioned above, wherein i=1 and j=0.

In one embodiment, in the polymer according to the invention, the repetitive unit (V) has the following formula (T2):

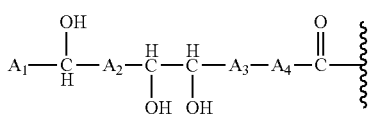

(T2)

wherein $A_1$, $A_2$, $A_3$ and $A_4$ are as defined above.

A unit having formula (T2) corresponds to a unit having formula (T) as mentioned above, wherein i=1 and j=0.

In one embodiment, the polymer according to the invention comprises:

at least one repetitive unit (W) having the following formula (L3):

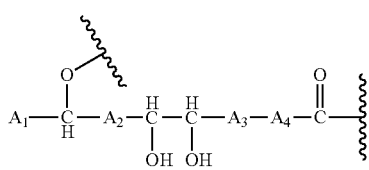

(L3)

and/or at least one repetitive unit (W) having the following formula (L4):

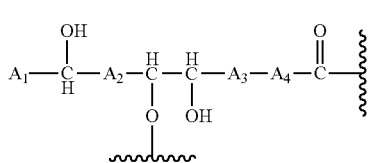

(L4)

and/or at least one repetitive unit (W) having the following formula (L5):

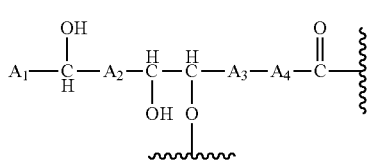

(L5)

wherein $A_1$, $A_2$, $A_3$ and $A_4$ are as defined above.

A unit having formula (L3) corresponds to a unit having formula (L) as mentioned above, wherein i=1, j=0, and $R_2=R_3=H$.

A unit having formula (L4) corresponds to a unit having formula (L) as mentioned above, wherein i=1, j=0, and $R_1=R_3=H$.

A unit having formula (L5) corresponds to a unit having formula (L) as mentioned above, wherein i=1, j=0, and $R_1=R_2=H$.

In one embodiment, the polymer according to the invention comprises at least one repetitive unit (W) having the formula (L3) and at least one repetitive unit having the formula (L4) and at least one repetitive unit (W) having the formula (L5).

In one embodiment, the polymer according to the invention comprises at least one repetitive unit (W) having the formula (L3) and at least one repetitive unit having the formula (L4).

In one embodiment, the polymer according to the invention comprises at least one repetitive unit (W) having the formula (L3) and at least one repetitive unit having the formula (L5).

In one embodiment, the polymer according to the invention comprises at least one repetitive unit (W) having the formula (L4) and at least one repetitive unit having the formula (L5).

In one embodiment, the polymer according to the invention comprises at least one repetitive unit (W) having the formula (L3).

In one embodiment, the polymer according to the invention comprises at least one repetitive unit (W) having the formula (L4).

In one embodiment, the polymer according to the invention comprises at least one repetitive unit (W) having the formula (L5).

In one embodiment, the polymer according to the invention comprises at least one repetitive unit (Q) having the formula (S) as defined above.

In one embodiment, the polymer according to the invention comprises:

at least one repetitive unit (Q) having the following formula (S1):

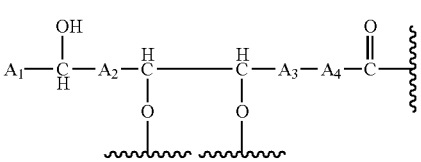

(S1)

and/or at least one repetitive unit (Q) having the following formula (S2):

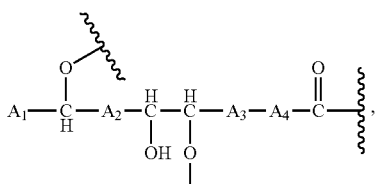

(S2)

and/or at least one repetitive unit (Q) having the following formula (S3):

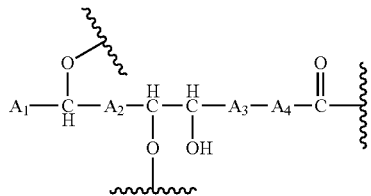

(S3)

wherein $A_1$, $A_2$, $A_3$ and $A_4$ are as defined above.

A unit having formula (S1) corresponds to a unit having formula (S) as mentioned above, wherein $R_1$=H.

A unit having formula (S2) corresponds to a unit having formula (S) as mentioned above, wherein $R_2$=H.

A unit having formula (S3) corresponds to a unit having formula (S) as mentioned above, wherein $R_3$=H.

In one embodiment, the polymer according to the invention comprises at least one repetitive unit (P) having the following formula (II):

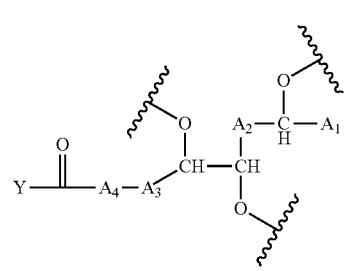

(II)

wherein Y, $A_1$, $A_2$, $A_3$ and $A_4$ are as defined above.

In one embodiment, the above-mentioned repetitive unit (P) has the formula (II-1):

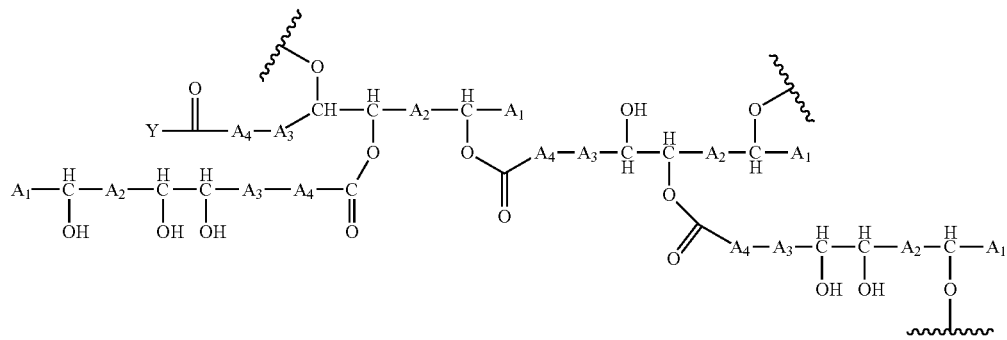

(II-1)

Y, $A_1$, $A_2$, $A_3$ and $A_4$ being as defined above.

In one embodiment, the above-mentioned repetitive unit (P) has the formula (II-1-1):

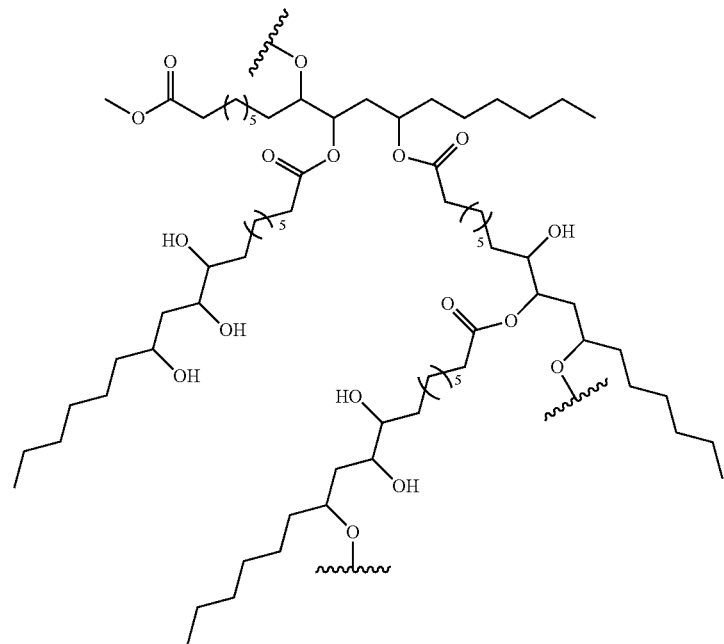

(II-1-1)

In one embodiment, the above-mentioned repetitive unit (P) has the formula (II-1-2):

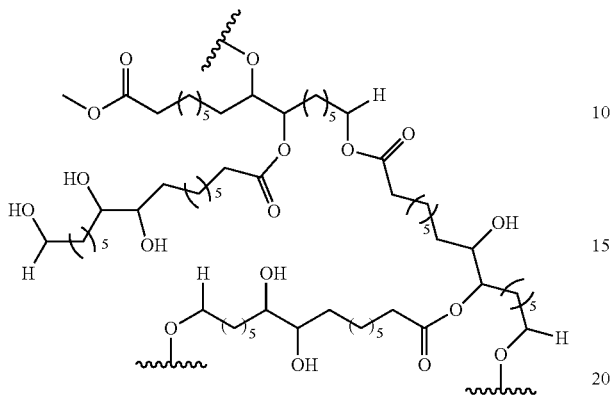
(II-1-2)

In one embodiment, the polymer according to the invention comprises:
- at least one repetitive unit (V) having the formula (T2) as defined above;
- at least one repetitive unit (W) having the formula (L3) as defined above;
- at least one repetitive unit (W) having the formula (L4) as defined above;
- at least one repetitive unit (W) having the formula (L5) as defined above;
- at least one repetitive unit (Q) having the formula (S1) as defined above;
- at least one repetitive unit (Q) having the formula (S2) as defined above;
- at least one repetitive unit (Q) having the formula (S3) as defined above;
- optionally at least one repetitive unit (P) having the formula (II-1) as defined above, in particular having the formula (II-1-1) or (II-1-2); and
- optionally at least one repetitive unit (U) having the formula (D2) as defined above.

In another embodiment, in the polymer according to the invention, the repetitive unit (U) has the following formula (D3):

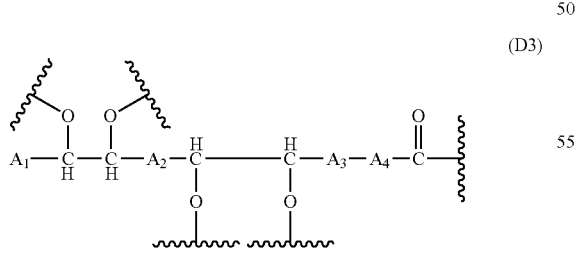
(D3)

wherein $A_1$, $A_2$, $A_3$ and $A_4$ are as defined above.

A unit having formula (D3) corresponds to a unit having formula (D) as mentioned above, wherein i=2 and j=0.

In one embodiment, in the polymer according to the invention, the repetitive unit (V) has the following formula (T3):

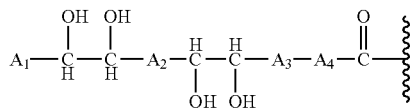
(T3)

wherein $A_1$, $A_2$, $A_3$ and $A_4$ are as defined above.

A unit having formula (T3) corresponds to a unit having formula (T) as mentioned above, wherein i=2 and j=0.

In one embodiment, the polymer according to the invention comprises:
- at least one repetitive unit (W) having the following formula (L6):

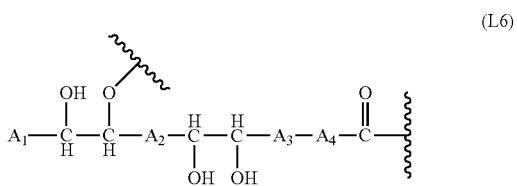
(L6)

and/or
- at least one repetitive unit (W) having the following formula (L7):

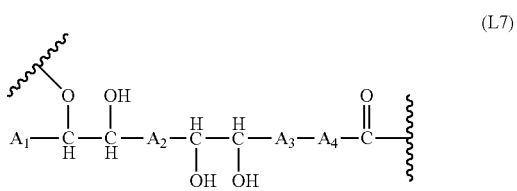
(L7)

and/or
- at least one repetitive unit (W) having the following formula (L8):

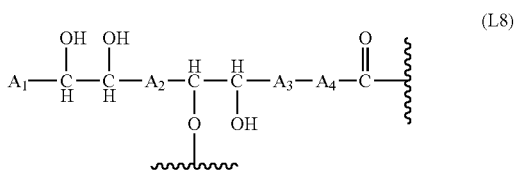
(L8)

and/or
- at least one repetitive unit (W) having the following formula (L9):

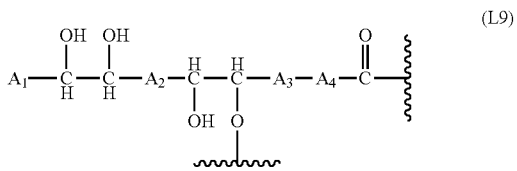
(L9)

wherein $A_1$, $A_2$, $A_3$ and $A_4$ are as defined above.

A unit having formula (L6) corresponds to a unit having formula (L) as mentioned above, wherein i=2, j=0, and $R_1=R_3=R_2=H$, and to a unit having formula (L″) as mentioned above, wherein $R_1=R_2=R_3=H$.

A unit having formula (L7) corresponds to a unit having formula (L) as mentioned above, wherein i=2, j=0, and $R_2=R'_1=R_3=H$ and to a unit having formula (L″) as mentioned above, wherein $R'_1=R_2=R_3=H$.

A unit having formula (L8) corresponds to a unit having formula (L) as mentioned above, wherein i=2, j=0, and $1:1_1=R'_1=R_3=H$ and to a unit having formula (L″) as mentioned above, wherein $R'_1=1:1_1=R_3=H$.

A unit having formula (L9) corresponds to a unit having formula (L) as mentioned above, wherein i=2, j=0, and $1:1_1=R_2=R'_1=H$ and to a unit having formula (L″) as mentioned above, wherein $R'_1=R_2=1:1_1=H$.

According to an embodiment, when i=2, the repetitive units of the polymer comprise two groups $R_1$ which may be identical or different.

In one embodiment, the polymer according to the invention comprises at least one repetitive unit (Q) having the formula (S') as mentioned above.

In one embodiment, the polymer according to the invention comprises:

at least one repetitive unit (Q) having the following formula (S4):

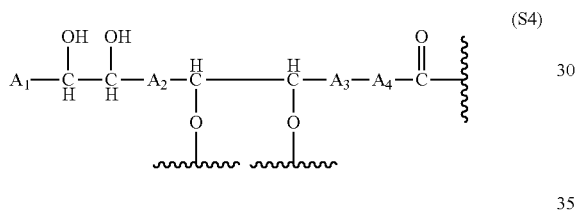

and/or at least one repetitive unit (Q) having the following formula (S5):

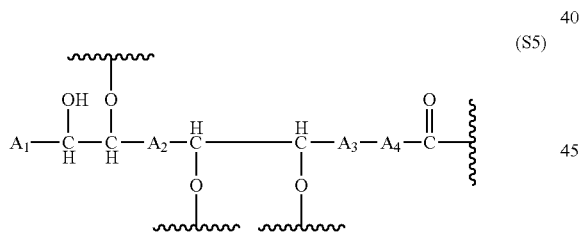

and/or at least one repetitive unit (Q) having the following formula (S6):

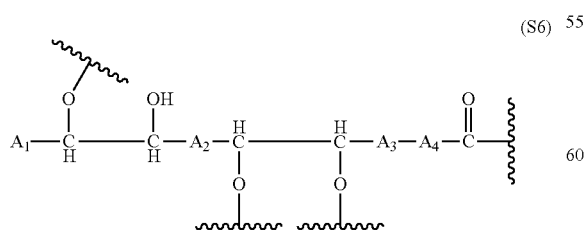

and/or at least one repetitive unit (Q) having the following formula (S7):

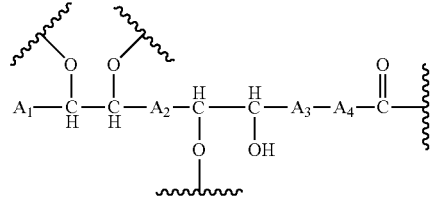

and/or at least one repetitive unit (Q) having the following formula (S8):

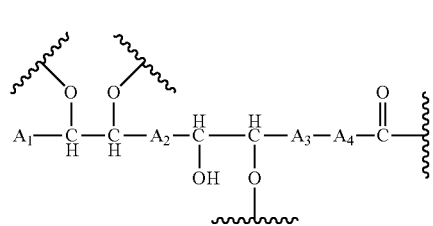

and/or at least one repetitive unit (Q) having the following formula (S9):

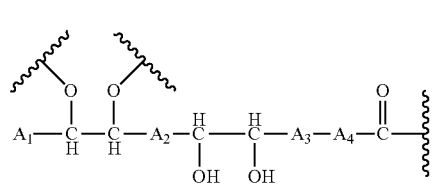

and/or at least one repetitive unit (Q) having the following formula (S10):

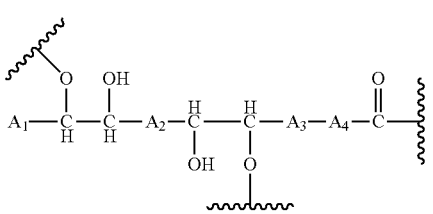

and/or at least one repetitive unit (Q) having the following formula (S11):

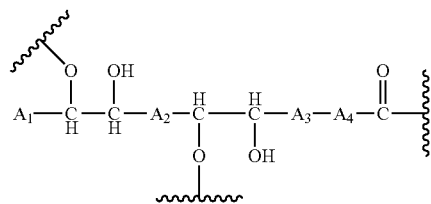
(S11)

and/or
at least one repetitive unit (Q) having the following formula (S12):

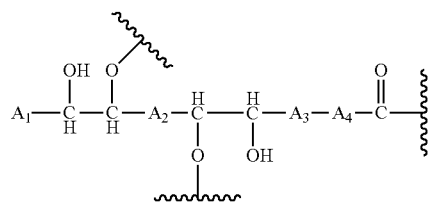
(S12)

and/or
at least one repetitive unit (Q) having the following formula (S13):

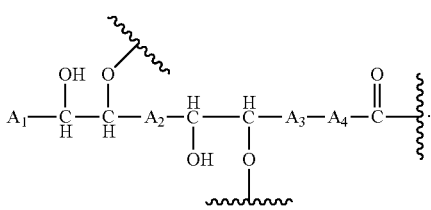
(S13)

A unit having formula (S4) corresponds to a unit having formula (S') as mentioned above, wherein $R_1=R'_1=H$.

A unit having formula (S5) corresponds to a unit having formula (S') as mentioned above, wherein $R_1=H$.

A unit having formula (S6) corresponds to a unit having formula (S') as mentioned above, wherein $R'_1=H$.

A unit having formula (S7) corresponds to a unit having formula (S') as mentioned above, wherein $R_3=H$.

A unit having formula (S8) corresponds to a unit having formula (S') as mentioned above, wherein $R_2=H$.

A unit having formula (S9) corresponds to a unit having formula (S') as mentioned above, wherein $R_2=R_3=H$.

A unit having formula (S10) corresponds to a unit having formula (S') as mentioned above, wherein $R'_1=R_2=H$.

A unit having formula (S11) corresponds to a unit having formula (S') as mentioned above, wherein $R'_1=R_3=H$.

A unit having formula (S12) corresponds to a unit having formula (S') as mentioned above, wherein $R_1=R_3=H$.

A unit having formula (S13) corresponds to a unit having formula (S') as mentioned above, wherein $R_1=R_2=H$.

In one embodiment, the polymer according to the invention comprises at least one repetitive unit (R) having the following formula (III):

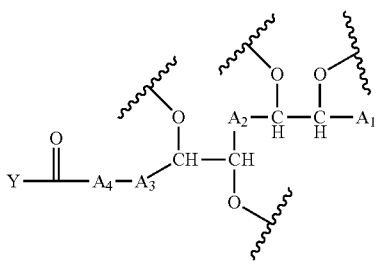
(III)

wherein Y, $A_1$, $A_2$, $A_3$ and $A_4$ are as defined above.

In one embodiment, the above-mentioned repetitive unit (R) has the following formula (III-1):

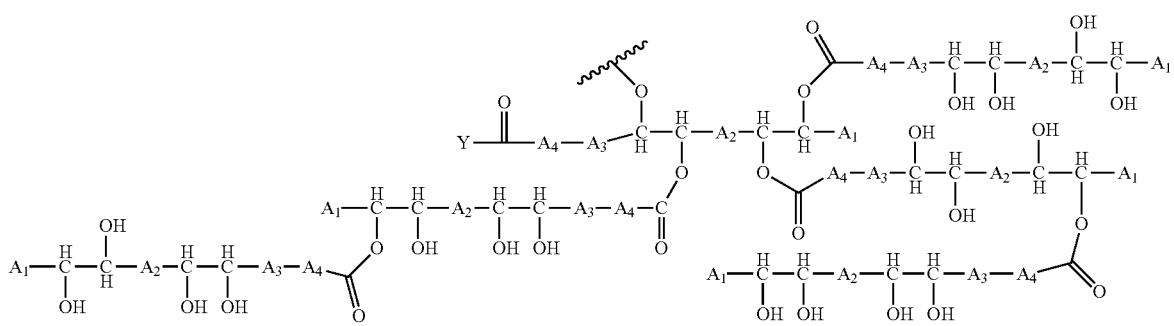

wherein Y, $A_1$, $A_2$, $A_3$ and $A_4$ are as defined above.

In one embodiment, the above-mentioned repetitive unit (R) has the following formula (III-1-1):

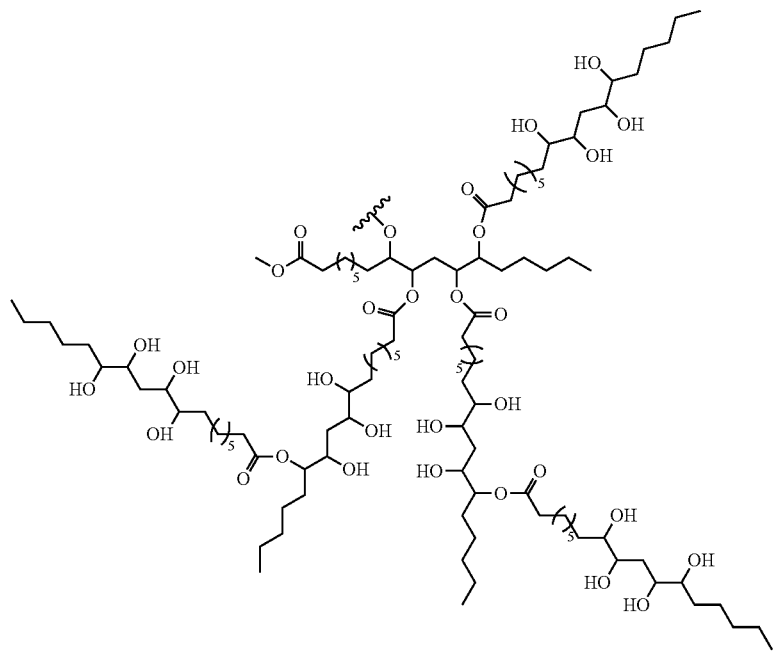

In one embodiment, the polymer according to the invention comprises:
- at least one repetitive unit (V) having the formula (T3) as defined above;
- at least one repetitive unit (W) having the formula (L6) as defined above;
- at least one repetitive unit (W) having the formula (L7) as defined above;
- at least one repetitive unit (W) having the formula (L8) as defined above;
- at least one repetitive unit (W) having the formula (L9) as defined above;
- at least one repetitive unit (Q) having the formula (S4) as defined above;
- at least one repetitive unit (Q) having the formula (S5) as defined above;
- at least one repetitive unit (Q) having the formula (S6) as defined above;
- at least one repetitive unit (Q) having the formula (S7) as defined above;
- at least one repetitive unit (Q) having the formula (S8) as defined above;
- at least one repetitive unit (Q) having the formula (S9) as defined above;
- at least one repetitive unit (Q) having the formula (S10) as defined above;
- at least one repetitive unit (Q) having the formula (S11) as defined above;
- at least one repetitive unit (Q) having the formula (S12) as defined above;
- at least one repetitive unit (Q) having the formula (S13) as defined above;
- optionally at least one repetitive unit (U) having the formula (D3) as defined above; and
- optionally at least one repetitive unit (R) having the formula (III) as defined above.

In one embodiment, in the polymer according to the invention, $A_1$ represents a pentyl, hexyl or heptyl group.

In one embodiment, in the polymer according to the invention, $A_4$ represents a butylene radical or hexylene radical.

In one embodiment, in the polymer according to the invention, $A_2$ represents a methylene, ethylene or pentylene radical.

In one embodiment, in the polymer according to the invention, $A_3$ represents a methylene, propylene, pentylene or butylene radical.

Preferred polymers according to the invention are those wherein $A_1$ represents H, i is 0, j is 0, $A_2$ represents a bond, and $A_3$ and $A_4$ represent a linear or branched divalent alkylene radical comprising from 1 to 20 carbon atoms.

Other preferred polymers according to the invention are those wherein $A_1$ represents H, i is 1, j is 0, and $A_2$, $A_3$ and $A_4$ represent, independently of each other, a linear or branched divalent alkylene radical comprising from 1 to 20 carbon atoms.

Other preferred polymers according to the invention are those wherein $A_1$ represents H, i is 0, j is 0, and $A_2$, $A_3$ and $A_4$ represent, independently of each other, a linear or branched divalent alkylene radical comprising from 1 to 20 carbon atoms.

Other preferred polymers according to the invention are those wherein i is 2, j is 0, $A_1$ represents a linear or branched divalent alkyl group comprising from 1 to 20 carbon atoms, and $A_2$, $A_3$ and $A_4$ represent, independently of each other, a linear or branched divalent alkylene radical comprising from 1 to 20 carbon atoms.

Other preferred polymers according to the invention are those wherein i is 0, j is 0, $A_1$ represents a linear or branched divalent alkyl group comprising from 1 to 20 carbon atoms, and $A_2$, $A_3$ and $A_4$ represent, independently of each other, a linear or branched divalent alkylene radical comprising from 1 to 20 carbon atoms.

Other preferred polymers according to the invention are those wherein i is 1, j is 0, $A_1$ represents a linear or branched divalent alkyl group comprising from 1 to 20 carbon atoms, and $A_2$, $A_3$ and $A_4$ represent, independently of each other, a linear or branched divalent alkylene radical comprising from 1 to 20 carbon atoms.

A preferred polymer according to the invention is a polymer wherein $A_1$ represents H, i is 0, j is 0, $A_2$ represents a bond, and $A_3$ and $A_4$ represent a butylene radical.

Another preferred polymer according to the invention is a polymer wherein $A_1$ represents H, i is 1, j is 0, $A_2$ represents a pentylene radical, $A_3$ represents a propylene radical and $A_4$ represents a butylene radical.

Another preferred polymer according to the invention is a polymer wherein $A_1$ represents a hexyl group, i is 0, j is 0, $A_2$ represents an ethylene radical, $A_3$ represents a pentylene radical and $A_4$ represents a hexylene radical.

Another preferred polymer according to the invention is a polymer wherein $A_1$ represents a pentyl group, i is 2, j is 0, $A_2$ represents a methylene radical, $A_3$ represents a propylene radical and $A_4$ represents a butylene radical.

Another preferred polymer according to the invention is a polymer wherein $A_1$ represents a heptyl group, i is 0, j is 0, $A_2$ represents a methylene radical, $A_3$ represents a methylene radical and $A_4$ represents a hexylene radical.

Another preferred polymer according to the invention is a polymer wherein $A_1$ represents a hexyl group, i is 1, j is 0, $A_2$ represents a methylene radical, $A_3$ represents a methylene radical and $A_4$ represents a hexylene radical.

In one embodiment, the polymer according to the invention has a number-average molecular weight $M_n$ comprised between 3 000 g/mol and 500 000 g/mol. In particular, the number-average molecular weight $M_n$ of the polymer is higher than 3 400 g/mol, preferably higher than 5 000 g/mol. In particular, number-average molecular weight $M_n$ of the polymer is lower than 250 000 g/mol, preferably lower than 100 000 g/mol, and more preferably lower than 20 000 g/mol.

As used herein, the term "$M_n$" means the number-average molecular weight of the polymer.

As used herein, the term "$M_w$" means the weight-average molecular weight of the polymer.

According to the invention, $M_n$ and $M_w$ are determined by steric exclusion chromatography in THF, using polystyrenes as standard.

In one embodiment, the polymer according to the invention has a dispersity comprised from 1 to 30, preferably from 1 to 20.

In the polymer according to the invention, the units (V), (U) and (Q), and optional units (W), have the same definition for $A_1$. The same applies for the definitions of $A_2$, $A_3$, $A_4$, i and j. For example, in a polymer comprising unit(s) (U), (V), (W) and (Q), when $A_1$ represents methyl in the unit(s) (U), $A_1$ thus also represents methyl in the unit(s) (V), (W) and (Q).

In one embodiment, the polymer according to the invention comprises at least one repetitive unit (R') having one of the following formulae:

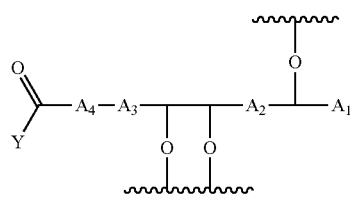

-continued

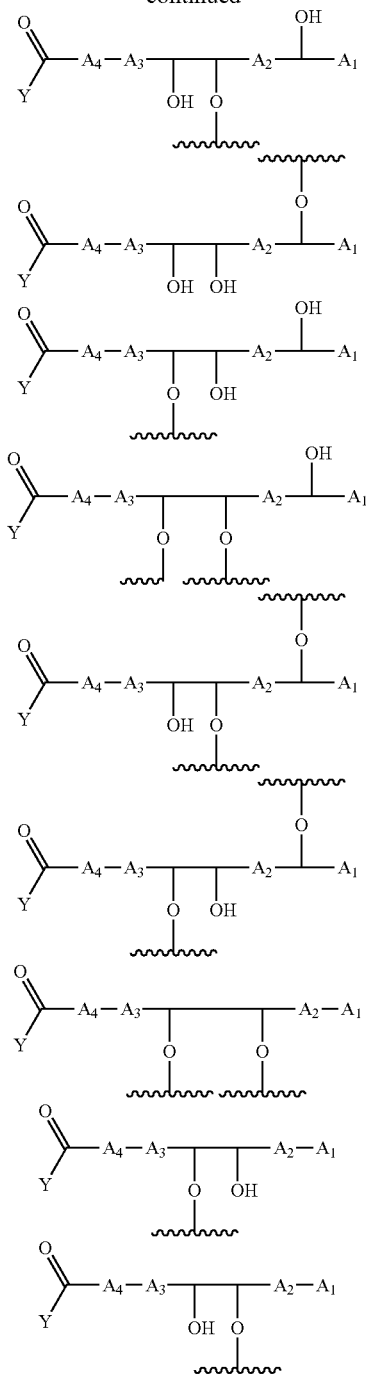

wherein $A_1$, $A_2$, $A_3$ and $A_4$ are as defined above.

As used herein, the term "alkyl" means a saturated aliphatic hydrocarbon group, which may be straight or branched, having about 1 to about 20 carbon atoms in the chain. Preferred alkyl groups have 1 to about 10 carbon atoms in the chain. The following alkyl groups may be cited as example: methyl, ethyl, propyl, butyl, pentyl, hexyl, heptyl, octyl, nonyl, decyl, dodecyl.

As used herein, the term "alkylene" (or "alkylidene") refers to a divalent radical comprising from 1 to 20 carbon atoms, and preferably from 1 to 12 carbon atoms, and more preferably 1 to 6 carbon atoms. When said radical is linear, it may be represented by the formula $(CH_2)_k$ wherein k is an integer varying from 1 to 12, and preferably from 1 to 6. The following alkylene may be cited as example: methylene, ethylene, propylene, butylene, pentylene, hexylene, heptylene, octylene, nonylene, decylene, dodecylene.

As used herein, the term "aryl" refers to an aromatic monocyclic or bicyclic hydrocarbon ring system having from 6 to 22, preferably 5 to 10, carbons atoms, wherein any ring atom capable of substitution may be substituted by a substituent. Examples of aryl moieties include, but are not limited to, phenyl, naphthyl, and anthracenyl.

As used herein, the polymer according to the invention is a branched polymer, in particular a branched polyester, comprising notably a combination of dendritic unit(s) (U), terminal unit(s) (V), optionally linear unit(s) (W) and optionally semi-dendritic unit(s) (Q), said units (U), (V), (W) and (Q) being as defined above.

The branched polymer of the invention comprises several polymeric chains corresponding notably to the succession of (U), (V), (W) or (Q) units.

In particular, in the polymer according to the invention, the different units (U), (V), optionally (W) and optionally (Q) of said polymer are linked to each other through 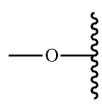 which is present on each unit.

In the present invention, 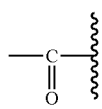 [SMILES: *C(C)=O] represents a bond which is a link between the different repetitive units of the polymer of the invention.

In particular, the repetitive units of the polymer of the invention comprise —O— moiety(ies) and/or —C(O)— moiety(ies) which are linked together to form ester bonds.

In particular, the

moiety in one unit (U), (V), (W) or (Q) is linked to a

moiety in another unit.

For example, one unit (D) may be linked to one unit (T) as follows, through a bond being present on the unit (D) and another which is present on the unit (T), as follows:

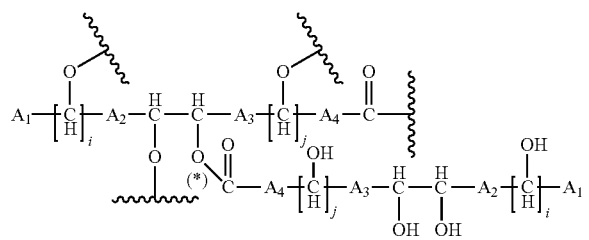

The bold bond (*) thus corresponds to the bond between the —O— moiety of a (D) unit and the —C(O)— moiety of a (T) unit.

Another example of linkage between units in the polymer of the invention is as follows:

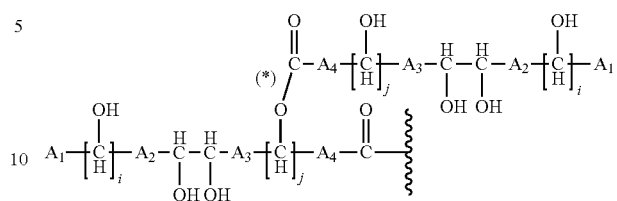

which corresponds to one unit (L), wherein $R_4$ represents

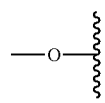

and $R_1$, $R_2$ and $R_3$ represent H, linked to one unit (T).

The bold bond (*) thus corresponds to the bond between the —O— moiety of a (L) unit and the —C(O)— moiety of a (T) unit.

The units of the polymer of the invention as mentioned above are thus linked together through —C(O)O— bonds, the —C(O)— moiety being part of one unit, and the —O— moiety being part of another unit. For example, when one unit (D) is linked to one unit (T) as mentioned above, there is the formation of a —C(O)O— bond between the unit (U) and the unit (T), wherein the —O— moiety comes from the unit (D) and the —C(O)— comes from the unit (T).

As used herein, the term "free hydroxyl group" means —OH.

As used herein,

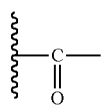 [SMILES: *C(C)=O]

moiety is not a free hydroxyl group but a "bound" hydroxyl group, and refers in particular to a —O— radical in one unit which is meant to be linked to a

moiety in another unit.

As used herein, a unit (U) of the polymer according to the invention is a dendritic unit. Examples of units (U) of the polymer are units of formulae (D1), (D2) or (D3). The dendritic units of the polymer of the invention comprise at least three bonds

and in particular 3, 4 or 5 such bonds.

In particular, a dendritic unit (U) of formula (D) is a unit which does not comprise any free hydroxyl group. In particular, a dendritic unit (U) of formula (D) comprises from 2 to 4

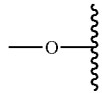

moieties. For example, when i and j are 0, then the dendritic unit (U) comprises 2

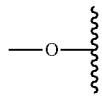

moieties, or when i is 2 and j is 0, then the dendritic unit (U) comprises 4

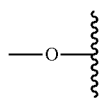

moieties.

As used herein, a unit (V) of the polymer according to the invention is a terminal unit. Examples of units (V) of the polymer are units of formulae (T1), (T2) or (T3). The terminal units of the polymer of the invention comprise in particular one bond

In particular, a terminal unit (V) of formula (T) is a unit which only comprises free hydroxyl groups. In particular, a terminal unit (V) of formula (T) comprises from 2 to 4 free hydroxyl groups. For example, when i and j are 0, then the terminal unit (V) comprises 2 free hydroxyl groups, or when i is 2 and j is 0, then the terminal unit (V) comprises 4 free hydroxyl groups.

As used herein, a unit (W) of the polymer according to the invention is a linear unit. Examples of units (W) of the polymer are units of formulae (L1), (L2), (L3), (L4), (L5), (L6), (L7), (L8) or (L9). The linear units of the polymer of the invention comprise two bonds

in particular.

In particular, a linear unit (W) of formula (L) is a unit which comprises only one

moiety and from 1 to 3 free hydroxyl group(s). For example, when i and j are 0, then the linear unit (W) comprises 1 free hydroxyl group and 1

moiety, or when i is 2 and j is 0, then the linear unit (W) comprises 3 free hydroxyl groups and 1

moiety.

As used herein, a unit (Q) of the polymer according to the invention is a semi-dendritic unit. Examples of unit (Q) of the polymer are units of formulae (S1), (S2), (S3), (S4), (S5), (S6), (S7), (S8), (S9), (S10), (S11), (S12) or (S13). The semi-dendritic units of the polymer of the invention comprise in particular at least three bonds

and in particular or 4 such bonds.

In particular, a semi-dendritic unit (Q) is a unit which comprises at least two

moieties and at least one free hydroxyl group. For example, the units (S1), (S2) and (S3) comprises one free hydroxyl group and two

moieties, while the units (S4) comprise two free hydroxyl groups and two

moieties.

The present invention also relates to a process for preparing the polymers as defined above. Therefore, the present invention also relates to a process for preparing a polymer as defined above, comprising a step of polymerization of at least one monomer of formula (IV):

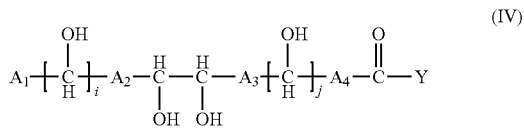
(IV)

wherein Y, $A_1$, $A_2$, $A_3$ and $A_4$ are as defined above;

said step being carried out in the presence of a catalyst selected from the group consisting of: $Zn(OAc)_2$ (anhydrous zinc acetate), $Ti(OBu)_4$ (titanium butoxide), $Ti(OiPr)_4$ (titanium isopropoxide), $Sb_2O_3$ (antimony (III) oxide), stannous octoate, DBTO (dibutyltin oxide), m-TBD (7-methyl-1,5,7-triazabicyclo(4.4.0)dec-5-ene), TBD (1,5,7-triazabicyclo[4.4.0]dec-5-ene).

said process optionally comprising a step of recovering said polymer.

The present invention also relates to a process for preparing the polymers as defined above. Therefore, the present invention also relates to a process for preparing a polymer as defined above, comprising a step of polymerization of at least one monomer of formula (IV):

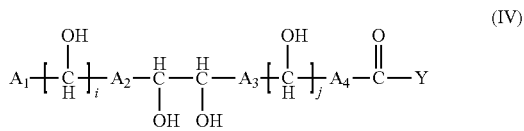
(IV)

wherein Y, $A_1$, $A_2$, $A_3$ and $A_4$ are as defined above;

said step being carried out in the presence of a catalyst selected from the group consisting of: NaOMe, $Zn(OAc)_2$ (anhydrous zinc acetate), $Ti(OBu)_4$ (titanium butoxide), $Ti(OiPr)_4$ (titanium isopropoxide), $Sb_2O_3$ (antimony (III) oxide), stannous octoate, DBTO (dibutyltin oxide), m-TBD (7-methyl-1,5,7-triazabicyclo(4.4.0)dec-5-ene), TBD (1,5,7-triazabicyclo[4.4.0]dec-5-ene).

said process optionally comprising a step of recovering said polymer.

According to a preferred embodiment, the catalyst is $Zn(OAc)_2$, 1,5,7-triazabicyclo[4.4.0]dec-5-ene, NaOMe or stannous octoate.

In one embodiment, in the process according to the invention, the catalyst is 1,5,7-triazabicyclo[4.4.0]dec-5-ene.

In one embodiment, in the process according to the invention, the catalyst is $Zn(OAc)_2$.

In one embodiment, in the process according to the invention, the catalyst is NaOMe.

The use of NaOMe is advantageous as it allows full conversion, and it is cheap, which is appropriate for an industrial scale process.

In one embodiment, the amount of catalyst is comprised from 0.05% to 10%, preferably from 0.5% to 5%, more preferably from 1% to 2%, and even more preferably from 1.2% to 1.8%, by weight relative to the weight of the monomer of formula (IV) as defined above.

In one embodiment, the monomer of formula (IV) has the formula (IV-1):

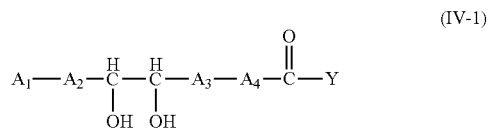
(IV-1)

wherein Y, $A_1$, $A_2$, $A_3$ and $A_4$ are as defined above.

In one embodiment, the monomer of formula (IV) has the formula (IV-2):

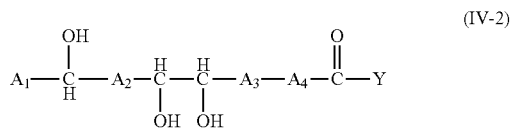
(IV-2)

wherein Y, $A_1$, $A_2$, $A_3$ and $A_4$ are as defined above.

In one embodiment, the monomer of formula (IV) has the formula (IV-3):

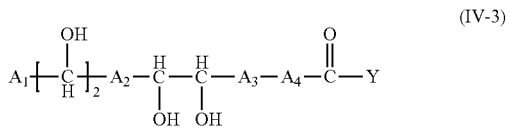
(IV-3)

wherein Y, $A_1$, $A_2$, $A_3$ and $A_4$ are as defined above.

In one embodiment, the monomer of formula (IV) is selected from the group consisting of the following monomers:

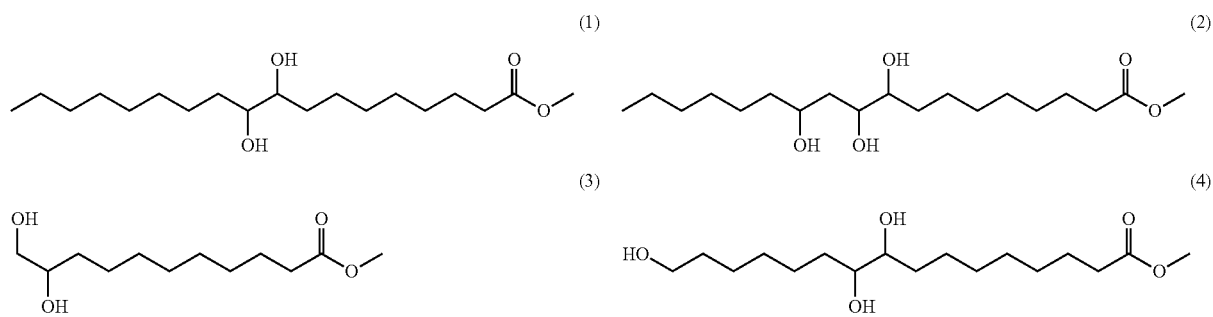

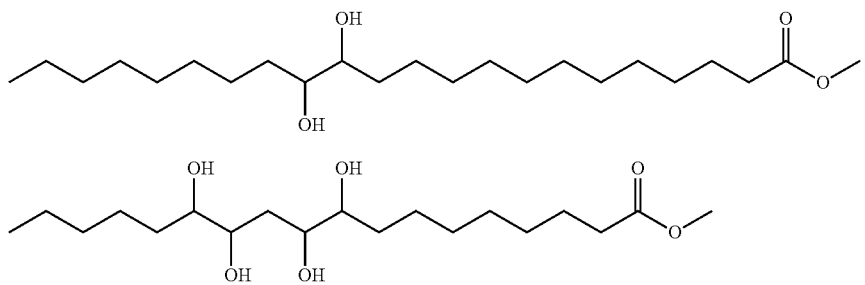

In one embodiment, when the monomer of formula (IV) is a monomer of formula (IV-1), and more particularly a monomer (1), (3) or (5) as mentioned above, then the process provides a polymer according to the invention comprising:
- at least one repetitive unit (U) having the formula (D1) as defined above;
- at least one repetitive unit (V) having the formula (T1) as defined above;
- at least one repetitive unit (W) having the formula (L1) as defined above;
- at least one repetitive unit (W) having the formula (L2) as defined above; and
- optionally at least one repetitive unit (Z) having the formula (I-1) as defined above, in particular having the formula (I-1-1), (I-1-2) or (I-1-3).

In one embodiment, when the monomer of formula (IV) is a monomer of formula (IV-2), and more particularly a monomer (2) or (4) as mentioned above, then the process provides a polymer according to the invention comprising:
- at least one repetitive unit (V) having the formula (T2) as defined above;
- at least one repetitive unit (W) having the formula (L3) as defined above;
- at least one repetitive unit (W) having the formula (L4) as defined above;
- at least one repetitive unit (W) having the formula (L5) as defined above;
- at least one repetitive unit (Q) having the formula (S1) as defined above;
- at least one repetitive unit (Q) having the formula (S2) as defined above;
- at least one repetitive unit (Q) having the formula (S3) as defined above;
- optionally at least one repetitive unit (U) having the formula (D2) as defined above; and
- optionally at least one repetitive unit (P) having the formula (II-1) as defined above, in particular having the formula (II-1-1) or (II-1-2).

In one embodiment, when the monomer of formula (IV) is a monomer of formula (IV-3), and more particularly a monomer (6) as mentioned above, then the process provides a polymer according to the invention comprising:
- at least one repetitive unit (V) having the formula (T3) as defined above;
- at least one repetitive unit (W) having the formula (L6) as defined above;
- at least one repetitive unit (W) having the formula (L7) as defined above;
- at least one repetitive unit (W) having the formula (L8) as defined above;
- at least one repetitive unit (W) having the formula (L9) as defined above;
- at least one repetitive unit (Q) having the formula (S4) as defined above;
- at least one repetitive unit (Q) having the formula (S5) as defined above;
- at least one repetitive unit (Q) having the formula (S6) as defined above;
- at least one repetitive unit (Q) having the formula (S7) as defined above;
- at least one repetitive unit (Q) having the formula (S8) as defined above;
- at least one repetitive unit (Q) having the formula (S9) as defined above;
- at least one repetitive unit (Q) having the formula (S10) as defined above;
- at least one repetitive unit (Q) having the formula (S11) as defined above;
- at least one repetitive unit (Q) having the formula (S12) as defined above;
- at least one repetitive unit (Q) having the formula (S13) as defined above;
- optionally at least one repetitive unit (U) having the formula (D3) as defined above; and
- optionally at least one repetitive unit (R) having the formula (III) as defined above.

In one embodiment, the polymerization of the monomer of formula (IV) is a bulk polymerization.

As used herein, the term "bulk polymerization" also known as "mass polymerization" means a polymerization carried out in the absence of solvent or dispersant.

In one embodiment, the process of the invention comprises a preliminary step consisting in heating the monomer of formula (IV) alone at a temperature comprised from 50° C. to 120° C., preferably at 90° C., in particular above its melting point, under dynamic vacuum. This step allows advantageously to remove all traces of solvents such as water.

In one embodiment, the polymerization step is carried out by heating the monomer of formula (IV) as defined above in the presence of the catalyst, at a temperature $T_1$ comprised from 90° C. to 130° C. for 1 hour to 48 hours, then by heating further at a temperature $T_2$ comprised from 90° C., preferably from 140° C., to 180° C. for 1 hour to 48 hours.

In one embodiment, $T_1$ and $T_2$ are different.

In one embodiment, the first heating step is carried out under nitrogen atmosphere.

In one embodiment, the second heating step is carried out under dynamic vacuum.

In one embodiment, the polymerization step is carried out by heating the monomer of formula (IV) as defined above in the presence of the catalyst, at a temperature $T_1$ comprised from 90° C., preferably from 100° C., to 120° C. for 1 hour to 48 hours, preferably for 1 to 10 hours, then by heating further at a temperature $T_2$ comprised from 90° C., preferably from 160° C. to 170° C. for 1 hour to 48 hours, preferably for 10 to 20 hours.

In one embodiment, the polymerization step is carried out by heating the monomer of formula (IV) as defined above in the presence of the catalyst, at a temperature $T_1$ comprised from 90° C., preferably from 100° C., to 120° C. for 1 hour to 3 hours, then by heating further at a temperature $T_2$ comprised from 90° C., preferably from 160° C., to 170° C. for about 13 hours.

In one embodiment, the polymerization step is carried out under nitrogen at a temperature $T_1$ comprised from 90° C. to 130° C.

In one embodiment, the polymerization step is further heated at a temperature $T_2$ comprised from 90° C., preferably from 140° C., to 180° C. under dynamic vacuum.

In a preferred embodiment, the process of the invention comprises two heating steps, a first step being carried out at a temperature $T_1$ comprised from 90° C., preferably from 100° C., to 120° C. for 1 hour to 48 hours, and then a second step being carried out at a temperature $T_2$ comprised from 90° C., preferably from 160° C., to 170° C. for 1 hour to 48 hours.

At the end of the first heating step, an intermediate oligomer is obtained which is then further heated in order to obtain the polymer of the invention.

In one embodiment, the process is a one-pot process, and in particular a two-steps one-pot process.

As used herein, the term "one-pot process" means a process wherein two or more reactions are conducted in a single reaction vessel without isolating or purifying the resulting intermediate(s). For example, the intermediate oligomer obtained after the first heating step of the monomer of formula (IV) at a temperature $T_1$ comprised from 90° C. to 130° C. and the second heating step at a temperature $T_2$ comprised from 90° C., preferably from 140° C., to 180° C.

The present invention also relates to a polymer susceptible to be obtained according to the process as defined above.

The invention is described in the foregoing by way of non-limiting examples.

EXAMPLES

Suppliers 1,5,7-triazabicyclo[4.4.0]dec-5-ene (98%), zinc acetate (99.99%), dibutyltin oxide (98%), 7-methyl-1,5,7-triazabicyclo[4.4.0]dec-5-ene, tin (II) 2-ethylhexanoate (95%) were obtained from Sigma Aldrich. Titanium (IV) n-butoxide (99%) and titanium (IV) isopropoxide (98+%) were purchased from Acros Organics. Antimony (III) oxide (99.6% min.) was supplied by Alfa Aesar. All products were used as received.

Analyses

The conditions of the steric exclusion chromatography were as follows:
Columns TSKgel TOSOH
HXL-L (guard 6*40)
G4000HXL (7.8*300)
G3000HXL (7.8*300)
G2000HXL (7.8*300)
Flow 1 mL/min
Flow marker TCB for trichlorobenzene (1 mL/500 mL THF)
Four 40° C.
Loop 20 µL
Calibration Polystyrene standards from polymer laboratories A. Monomers The following monomers have been used:

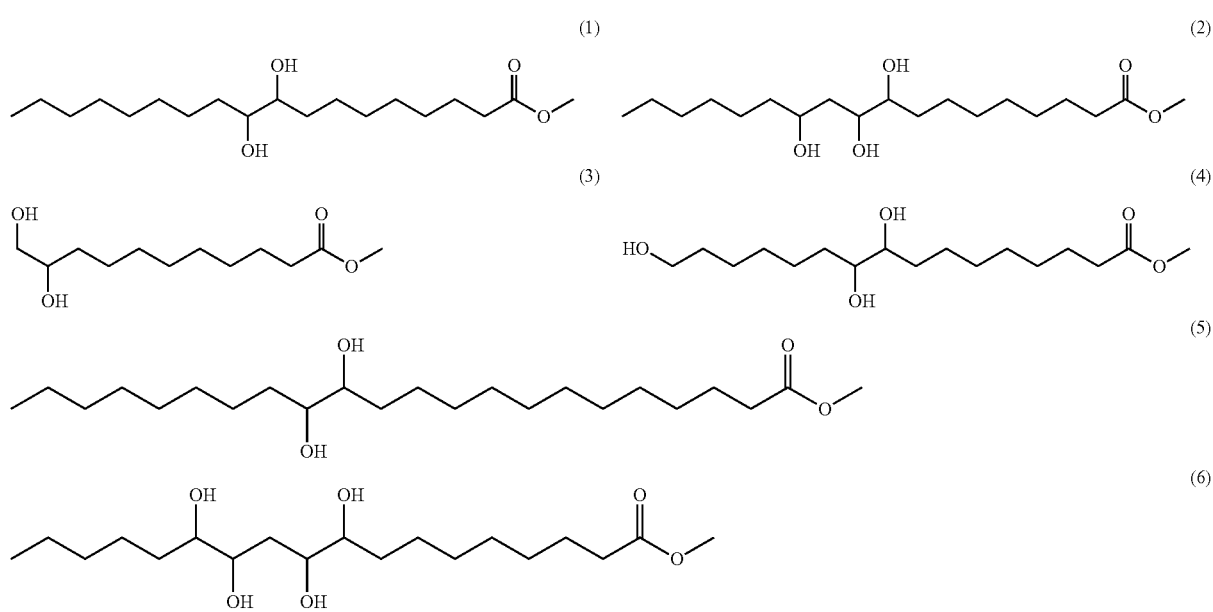

The monomer (1) has been prepared following a two-step procedure. Methyl esters of high oleic sunflower oil and formic acid (0.3 n) were added in a 100 L reactor equipped with a mechanical stirrer and a condenser, n being the number of mole of double bond on the methyl esters. The resulting mixture was heated at 70° C. for 1 hour under stirring. At 70° C., hydrogen peroxide (35%, 2 n) was added slowly to the reactor using a volumetric pump while maintaining the temperature in the reactor close to 75-80° C. When the addition was finished, the temperature was risen to 90° C. for 2 hours. The reaction was monitored by gas chromatography. The reaction mixture was then cooled down to 40° C. temperature and the aqueous phase was discarded. The organic layer was washed with an aqueous solution of sodium hydroxide (0.1 N) until the pH becomes neutral. The organic phase was finally dried under vacuum to afford a clear and slightly yellow liquid (Oxiran number ~5.0%). In a second step, 1 portion of epoxydized methyl esters of oleic sunflower oil was placed along with ½ portion of an aqueous solution of phosphoric acid (12% w/w) and ⅓ portion of tert-butanol as solvent in a 100 L reactor equipped with a condenser and a mechanical stirrer. The resulting mixture was then heated at 90° C. under vigorous stirring. The reaction was monitored by gas chromatography. When the reaction was completed the aqueous phase was discarded at 50° C. The tert-butanol was eliminated under vacuum distillation. The organic phase was then washed with hot water until the pH reaches 6-7 and dried under vacuum. The methyl 9,10-dihydroxystearate (1) was recrystallized in cyclohexane to afford a white solid powder. The yield of the two-step synthesis of methyl 9, 10-dihydroxystearate is about 90%.

The monomer (2) has been prepared following a two-step procedure. Methyl esters of castor oil and formic acid (0.3 n) were added in a reactor equipped with a mechanical stirrer, a dropping funnel and a condenser, n being the number of mole of double bond of the methyl esters. The resulting mixture was heated at 40° C. for 1 hour under stirring condition. At 40° C., hydrogen peroxide (50%, 2 n) was added drop wise to the reactor using a dropping funnel while maintaining the temperature in the reactor close to 70 75° C. The reaction was monitored by gas chromatography. The reaction mixture was then cooled down to room temperature and the aqueous phase discarded. The organic layer was washed with an aqueous solution of sodium hydroxide (0.1N) until the pH becomes neutral. The organic phase was then dried under vacuum at 60° C. to afford a clear and slightly yellow liquid with a precipitate. The precipitate isolated by filtration is the methyl 9, 10, 12-trihydroxystearate, the yellow liquid corresponds to the epoxidized methyl esters of castor oil.

In a second step, 1 portions of epoxidized methyl esters of castor oil was placed along with ½ portion of an aqueous solution of phosphoric acid (12% w/w) and ⅓ portion of tert-butanol as solvent in a reactor equipped with a condenser and a mechanical stirrer. The resulting mixture was then heated at 90° C. under vigorous stirring. The reaction was monitored by gas chromatography. When the reaction was completed the aqueous phase was discarded at 50° C. The tert-butanol was eliminated under vacuum distillation. The organic phase was then washed with hot water until the pH reaches 6-7 and dried under vacuum. The methyl 9, 10, 12-trihydroxystearate (2) was then recrystallized in cyclohexane to afford a white solid powder in a 25% yield.

The monomer (3) has been previously prepared by the process as described in U.S. Pat. No. 5,344,946.

The monomer (4) has been prepared by esterification of aleuritic acid in methanol. A round-botttomed flask was charged with 5 g of aleuritic acid, 50 mL of methanol and 1 g of Amberlyst 15. The mixture was heated at 70° C. under reflux for 24 hours. After reaching rt, the resin was filtered, the methanol removed under vacuum and 100 ml of DCM was added. The organic phase was washed twice with water, dried on anhydrous magnesium suflate and DCM was removed under vacuum. Monomer (4) was thus obtained as a white solid powder (yield: 75%).

Refined erucic acid rapeseed oil (800 Kg) was heated under stirring condition at 65° C. in the presence of methanol (190 Kg) and sodium methanolate (19 Kg) for 2 hours. The thus-obtained methyl esters were decanted and the glycerol phase discarded. Methyl esters of erucic acid rapeseed oil were then washed with water, dried under vacuum and distilled on a falling film reactor (200 L/hour) in order to concentrate the erucic acid methyl ester up to 95%. The procedure followed to prepare the monomer (5) starting from methyl erucate was identical to the one described earlier to obtain the monomer (1).

B. Preparation of the Branched Polymers

General Procedure 0.500 g of a monomer was added to a Schlenk flask equipped with a magnetic stirrer, a nitrogen inlet tube and an oil-bath heating system. The monomer was firstly is dried alone under dynamic vacuum, above its melting point at 90° C. This pre-drying step took one hour, then the reaction mixture was placed under nitrogen blowing, the temperature was raised to 120° C. and 7.5 mg (1.5 wt %) of catalyst was introduced in the reaction flask. The mixture was subsequently allowed to react under stirring at 120° C. during 2 hours. Finally, the temperature was raised to 160° C. or 170° C. and dynamic vacuum was applied for 13 hours in order to remove the released methanol. The crude product was obtained as a colorless and highly viscous material. It was purified by precipitation from THF to pentane.

Six branched polymers were prepared according to the general procedure mentioned above. Such polymers derived from the above-mentioned monomers (1), (2), (3), (4), (5) and (6).

Example 1: Polyester Derived From Monomer (1)

Different polyesters were synthesized according to the general procedure as described above.

| Entry | Catalyst[a] | T (° C.)[b] | Conversion (%)[c] | $M_n$ (g·mol$^{-1}$)[c] | $M_w$ (g·mol$^{-1}$)[c] | Đ[c] | DB[d] |
|---|---|---|---|---|---|---|---|
| 1 | Ti(OBu)$_4$ | 170 | 64 | 1300 | 1490 | 1.15 | 0 |
| 2 | Zn(OAc)$_2$ | 170 | 98 | 6280 | 96500 | >15.4 | 0.08 |
| 3 | DBTO | 170 | 67 | 1270 | 1430 | 1.13 | 0.06 |
| 4 | Sb$_2$O$_3$ | 170 | 71 | 1450 | 1750 | 1.21 | 0.08 |
| 5 | TBD | 170 | 100 | 4220 | 14070 | 3.33 | 0.23 |
| 6 | Zn(OAc)$_2$ | 160 | 98 | 3480 | 9530 | 2.74 | 0.02 |
| 7 | TBD | 160 | 100 | 4080 | 10110 | 2.48 | 0.21 |
| 8 | NaOMe | 160 | 100 | 6 100 | 18 800 | 3.08 | 0.29 |

[a]Loading in catalyst: 1.5 wt %.
[b]Temperature of the last stage of polymerization.
[c]SEC in THF, PS calibration.
[d]1H-NMR. Đ: dispersity, DB: degree of branching The conversion corresponds to the percentage by weight of conversion of the monomer (1).

$M_n$, $M_w$ and Đ were determined by steric exclusion chromatography in THF with polystyrene standards, and the degree of branching was determined by RMN $^1$H.

Thermo-mechanical properties of the renewable polymers obtained were characterized by Differential Scanning calorimetry (DSC) and Thermal Gravimetric Analysis (TGA).

Highly branched polyesters displayed amorphous properties with glass transition temperature in the range −32.5° C. to −20° C. for polyesters derived from the polymerization of monomer (1). Some results are provided in the following table:

| Catalyst | Loading in catalyst (wt %) | Conversion (%)$^a$ | $M_n$ (g · mol$^{-1}$)$^a$ | Đ$^a$ | DB$^b$ | $T_g^c$ (° C.) | $T_{10\%}^d$ (° C.) |
|---|---|---|---|---|---|---|---|
| Stannous octoate | 1.5 | 93 | 3160 | 2.04 | 0.11 | −30 | 284 |
| Zn(OAc)$_2$ | 1.5 | 98 | 3480 | 2.74 | 0.02 | −27 | 266 |
| TBD | 1.5 | 100 | 5340 | 2.97 | 0.21 | −24 | 339 |
| TBD | 5 | 100 | 9825 | 3.37 | 0.28 | −20 | 340 |

$^a$SEC in THF, PS calibration.
$^b$$^1$H-NMR.
$^c$DSC.
$^d$TGA. Đ: dispersity, DB: degree of branching The resulting polymers provide the following RMN$^1$H spectrum:
$^1$H NMR (400 MHz, DMSO) δ 4.91, 4.71, 4.70, 4.69, 4.60, 4.59, 4.09, 3.57, 3.39, 3.18, 2.50, 2.27, 2.27, 2.25, 2.24, 1.52, 1.37, 1.23, 1.02, 0.87, 0.85, 0.83, 0.62.

Example 2: Polyester Derived From the Monomer (2)

Different polyesters were synthesized according to the general procedure as described above.

| Catalyst$^a$ | T (° C.)$^b$ | Conversion$^a$ (%) | $M_n^a$ (g · mol$^{-1}$) | Đ$^a$ | $T_g^b$ (° C.) | $T_{10\%}^c$ (° C.) |
|---|---|---|---|---|---|---|
| Zn(OAc)$_2$ | 160 | 97 | 3800 | 2.57 | −2.5 | 271 |
| TBD | 160 | 100 | 5540 | 4.09 | −0.9 | 323 |
| NaOMe | 160 | 98 | 4600 | 2.83 | 3.3 | 320 |

$^a$SEC in THF, PS calibration
$^b$DSC.
$^c$TGA. Đ: dispersity

The conversion corresponds to the conversion of the monomer (2).
Highly branched polyesters displayed amorphous properties with glass transition temperature in the range from −13.2 to 0.6° C. for polyesters derived from monomer (2). $M_n$, $M_w$ and Đ were determined by steric exclusion chromatography in THF with polystyrene standards, and the degree of branching was determined by RMN $^1$H.
The resulting polymers provide the following RMN$^1$H spectrum:
$^1$H NMR (400 MHz, DMSO) δ 5.17, 4.98, 4.97, 4.87, 4.77, 4.65, 4.64, 4.53, 4.32, 4.26, 4.20, 4.13, 4.10, 3.70, 3.59, 3.57, 3.49, 3.41, 3.31, 3.25, 3.17, 2.50, 2.22, 1.49, 1.39, 1.32, 1.30, 1.23, 0.85.

Example 3: Polyester Derived From Monomer (3)

Polyesters were synthesized according to the general procedure as described above.

| Catalyst$^a$ | Conv. (%)$^b$ | $M_n$ (g · mol$^{-1}$)$^c$ | $M_w$ (g · mol$^{-1}$)$^c$ | Đ$^b$ |
|---|---|---|---|---|
| Zn(OAc)$_2$ | 98 | 2349 | 5622 | 2.39 |
| TBD | 95 | 2370 | 6390 | 2.70 |

$^a$Loading in catalyst: 1.5 wt %.
$^b$SEC in THF. Đ: dispersity

As mentioned above, the monomer was firstly dried for one hour alone under dynamic vacuum, above its melting point at 90° C. The first step of polymerization was carried out at 120° C. for 2 hours and the second step of polymerization was carried out at 140° C. for 13 hours.

It can be seen from the above table that the conversions are close to 100%.

Example 4: Polyester Derived From Monomer (4)

A polyester was synthesized according to the general procedure as described above.

| Catalyst$^a$ | Conv. (%)$^b$ | $M_n$ (g · mol$^{-1}$)$^c$ | $M_w$ (g · mol$^{-1}$)$^c$ | Đ$^b$ |
|---|---|---|---|---|
| TBD | 96 | 3550 | 8510 | 2.40 |

$^a$Loading in catalyst: 1.5 wt %.
$^b$SEC in THF. Đ: dispersity

As mentioned above, the first step of polymerization was carried out at 120° C. and the second step of polymerization was carried out at 140° C.

The above table corresponds to the polymerization results after two hours.

Another polymerization was also carried out as follows: pre-drying at 90° C. under dynamic vacuum, then the first step of polymerization was carried out at 90° C. under nitrogen, and the second step of polymerization was carried out at 90° C. for x hours under dynamic vacuum.

The resulting polymer was obtained:

| Catalyst[a] | x (hours) | Conv. (%)[b] | $M_n$ (g·mol$^{-1}$)[c] | $M_w$ (g·mol$^{-1}$)[c] | Đ[b] | $T_g$[c] (°C.) | $T_{10\%}$[d] (°C.) |
|---|---|---|---|---|---|---|---|
| TBD | 1 h 30 | 99 | 9270 | 44630 | 4.81 | −16 | 358 |
| TBD | 1 h | 100 | 9300 | 44 700 | 4.81 | −15.2 | 358 |
| TBD[e] | 4 h | 100 | 13000 | 75400 | 5.80 | −14.4 | 342 |
| NaOMe | 2 | 98 | 4800 | 13900 | 2.9 | −16.7 | 350 |

[a]Loading in catalyst: 1.5 wt %.
[b]SEC in THF.
[c]DSC.
[d]TGA.
[e]loading in TBD: 1 w %

Example 4: Polyester Derived From Monomer (5)

A polyester was synthesized according to the general procedure as described above.

| Catalyst[a] | Conv. (%)[b] | $M_n$ (g·mol$^{-1}$)[c] | $M_w$ (g·mol$^{-1}$)[c] | Đ[b] | DB[c] | $T_{10\%}$[d] (°C.) |
|---|---|---|---|---|---|---|
| Zn(Ac)$_2$ | 95 | 3000 | 5800 | 1.93 | 0.09 | / |
| TBD | 100 | 5600 | 17100 | 3.05 | 0.33 | 320 |
| NaoMe | 100 | 9200 | 30100 | 3.27 | 0.30 | 350 |

[a]Loading in catalyst: 1.5 wt %.
[b]SEC in THF.
[c]1H-NMR.
[d]TGA. Đ: dispersity,
DB: degree of branching As mentioned above, the first step of polymerization was carried out at 120° C. and the second step of polymerization was carried out at 160° C.

The invention claimed is:

1. A polymer comprising:
   i) at least one repetitive unit (V) having the following formula (T):

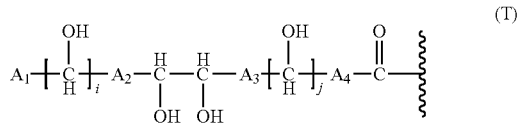

and ii) at least one repetitive unit(s) (U) having the following formula (D):

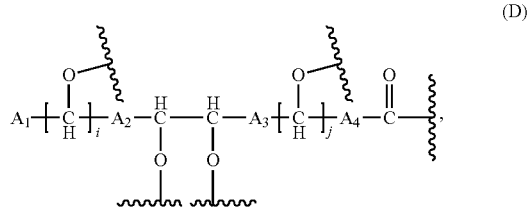

or at least one repetitive unit(s) (Q) having the following formula (S):

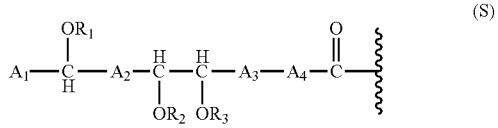

or at least one repetitive unit(s) (Q) having the following formula (S'):

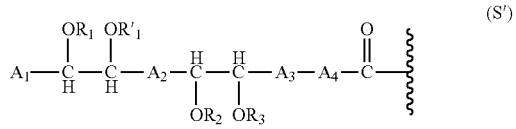

wherein:

$A_1$ represents H or a linear or branched divalent alkyl group comprising from 1 to 20 carbon atoms;

$A_4$ represents a linear or branched divalent alkylene radical comprising from 1 to 20 carbon atoms;

$A_2$ represents a bond or a linear or branched divalent alkylene radical comprising from 1 to 20 carbon atoms;

$A_3$ represents a linear or branched divalent alkylene radical comprising from 1 to 20 carbon atoms;

$R_1$, $R'_1$, $R_2$ and $R_3$ are or H;

i is 0, 1 or 2;

j is 0 or 1;

i being 0 when j is 1 and j being 0 when i is 1 or 2;

when $A_1$ is H and i is 0, then $A_2$ is a bond, and wherein:

in the unit (U) having the formula (S), only one of $R_1$, $R_2$ and $R_3$ is H;

in the unit (U) having the formula (S'), one or two of $R_1$, $R'_1$, $R_2$ and $R_3$ is H.

2. The polymer according to claim 1, further comprising at least one repetitive unit (W) having the following formula (L):

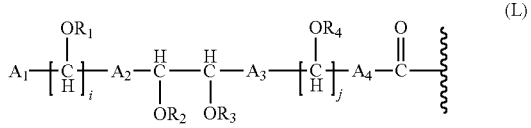 (L)

wherein:

$A_1$, $A_2$, $A_3$, $A_4$, i and j are as defined in claim 1; and $R_1$, $R_2$, $R_3$ and $R_4$ being

or H, three of $R_1$, $R_2$, $R_3$ and $R_4$ being H.

3. The polymer according to claim 1, wherein the number-average molecular weight $M_n$ is comprised between 3 000 g/mol and 500 000 g/mol.

4. The polymer according to claim 1, comprising at least three repetitive units (V) having the formula (T).

5. The polymer according to claim 1, wherein the repetitive unit (U) has one of the following formulae (D1), (D2) or (D3):

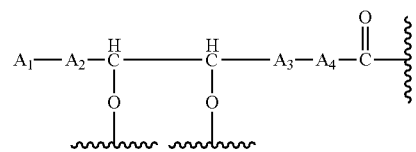 (D1)

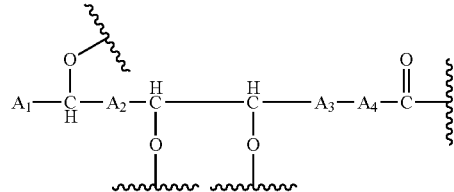 (D2)

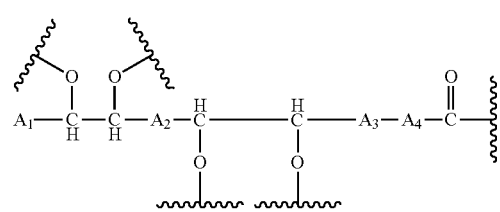 (D3)

wherein $A_1$, $A_2$, $A_3$ and $A_4$ are as defined in claim 1.

6. The polymer according to claim 1, wherein the repetitive unit (V) has the one of the following formulae (T1), (T2) or (T3):

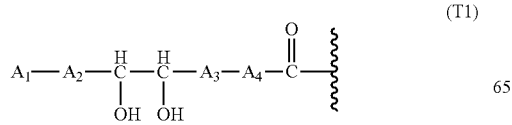 (T1)

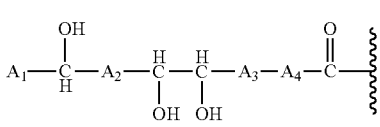 (T2)

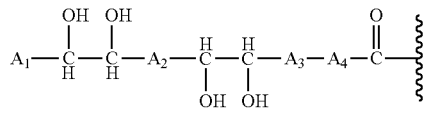 (T3)

wherein $A_1$, $A_2$, $A_3$ and $A_4$ are as defined in claim 1.

7. The polymer according to claim 1, comprising:

at least one repetitive unit (W) having the following formula (L1):

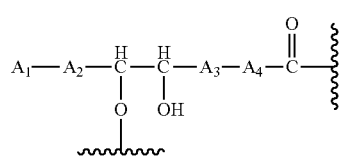 (L1)

and/or at least one repetitive unit (W) having the following formula (L2):

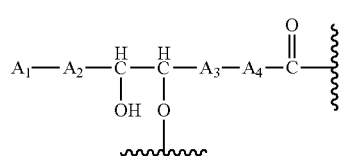 (L2)

wherein $A_1$, $A_2$, $A_3$ and $A_4$ are as defined in claim 1;

or at least one repetitive unit (W) having the following formula (L3):

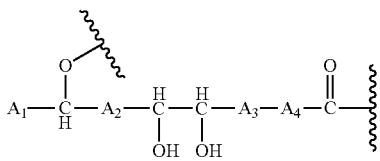 (L3)

and/or at least one repetitive unit (W) having the following formula (L4):

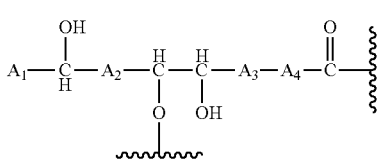 (L4)

and/or at least one repetitive unit (W) having the following formula (L5):

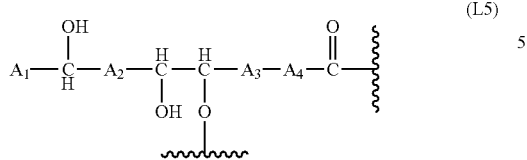
(L5)

wherein $A_1$, $A_2$, $A_3$ and $A_4$ are as defined in claim 1;
or
at least one repetitive unit (W) having the following formula (L6):

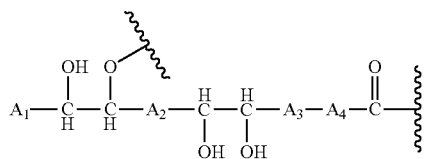
(L6)

and/or
at least one repetitive unit (W) having the following formula (L7):

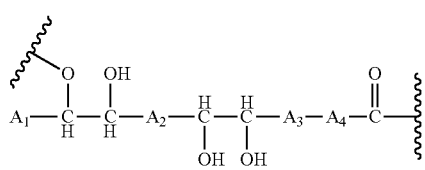
(L7)

and/or
at least one repetitive unit (W) having the following formula (L8):

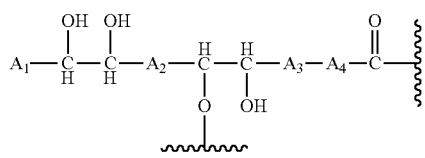
(L8)

and/or
at least one repetitive unit (W) having the following formula (L9):

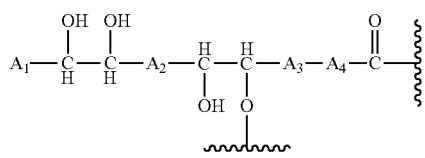
(L9)

wherein $A_1$, $A_2$, $A_3$ and $A_4$ are as defined in claim 1.

8. The polymer according to claim 1, wherein:

$A_1$ represents H, i is 0, j is 0, $A_2$ represents a bond, and $A_3$ and $A_4$ represent a butylene radical; or $A_1$ represents H, i is 1, j is 0, $A_2$ represents a pentylene radical, $A_3$ represents a propylene radical and $A_4$ represents a butylene radical; or $A_1$ represents a hexyl group, i is 0, j is 0, $A_2$ represents an ethylene radical, $A_3$ represents a pentylene radical and $A_4$ represents a hexylene radical; or $A_1$ represents a pentyl group, i is 2, j is 0, $A_2$ represents a methylene radical, $A_3$ represents a propylene radical and $A_4$ represents a butylene radical; or $A_1$ represents a heptyl group, i is 0, j is 0, $A_2$ represents a methylene radical, $A_3$ represents a methylene radical and $A_4$ represents a hexylene radical; or $A_1$ represents a hexyl group, i is 1, j is 0, $A_2$ represents a methylene radical, $A_3$ represents a methylene radical and $A_4$ represents a hexylene radical.

9. A process for preparing a polymer according to claim 1, comprising a step of polymerization of at least one monomer of formula (IV):

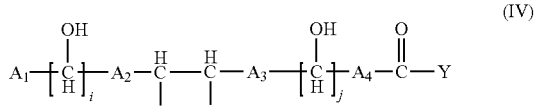
(IV)

wherein:

$A_1$, $A_2$, $A_3$ and $A_4$ are as defined in claim 1;

Y represents $-OR_a$, $R_a$ being a linear or branched alkyl radical comprising from 1 to 20 carbon atoms or an aryl radical comprising from 6 to 22 carbon atoms;

said step being carried out in the presence of a catalyst selected from the group consisting of: NaOMe, $Zn(OAc)_2$, $Ti(OBu)_4$, $Ti(OiPr)_4$, $Sb_2O_3$, stannous octanoate, dibutyltin oxide, 7-methyl-1,5,7-triazabicyclo(4.4.0)dec-5-ene, and 1,5,7-triazabicyclo[4.4.0]dec-5-ene, said process optionally comprising a step of recovering said polymer.

10. The process of claim 9, wherein the catalyst is $Zn(OAc)_2$, NaOMe or 1,5,7-triazabicyclo[4.4.0]dec-5-ene.

11. The process according to claim 9, wherein the amount of catalyst is comprised from 0.05% to 10% by weight relative to the weight of the monomer of formula (IV).

12. The process according to claim 9, wherein the polymerization step is carried out by heating the monomer of formula (IV) as defined in claim 9 in the presence of the catalyst, at a temperature T1 comprised from 90° C. to 130° C. for 1 hour to 48 hours, then by heating further at a temperature T2 comprised from 90° C. to 180° C. for 1 hour to 48 hours.

13. A polymer susceptible to be obtained according to the process according to claim 9.

* * * * *